United States Patent

Kertscher et al.

[11] Patent Number: 5,991,485
[45] Date of Patent: Nov. 23, 1999

[54] MANUFACTURING METHOD FOR AN OPTICAL CABLE AND CABLE OBTAINED BY SUCH A METHOD

[75] Inventors: Eberhard Kertscher, Yvonand; Bruno Buluschek, Echandens, both of Switzerland

[73] Assignee: Swisscab S.A., Switzerland

[21] Appl. No.: 09/057,374

[22] Filed: Apr. 9, 1998

[30] Foreign Application Priority Data

Apr. 14, 1997 [EP] European Pat. Off. ............... 97106094

[51] Int. Cl.⁶ .................................................. G02B 6/44
[52] U.S. Cl. .......................... 385/100; 385/106; 385/112; 385/114; 264/1.24
[58] Field of Search .................... 385/100–114; 264/1.24, 1.25, 1.26

[56] References Cited

U.S. PATENT DOCUMENTS

| | | | |
|---|---|---|---|
| 4,372,792 | 2/1983 | Dey et al. | 156/48 |
| 5,247,599 | 9/1993 | Vyas et al. | 385/113 |
| 5,263,239 | 11/1993 | Ziemek | 29/458 |
| 5,372,757 | 12/1994 | Schneider | 264/1.28 |
| 5,555,338 | 9/1996 | Haag et al. | 385/101 |

FOREIGN PATENT DOCUMENTS

| | | |
|---|---|---|
| 0 108 510 | 5/1984 | European Pat. Off. . |
| 0 299 123 | 1/1989 | European Pat. Off. . |
| 0 425 160 | 5/1991 | European Pat. Off. . |
| 0 744 639 | 11/1996 | European Pat. Off. . |
| 2 650 081 | 1/1991 | France . |
| 2 205 621 | 8/1973 | Germany . |
| 27 57 786 | 6/1979 | Germany . |

*Primary Examiner*—Phan T. H. Palmer
*Attorney, Agent, or Firm*—Griffin, Butler, Whisenhunt & Szipl, LLP

[57] ABSTRACT

This method allows manufacture of an optical cable including optical fibers (1) placed in a protective sheath including two coaxial tubes (3, 5), of which the inner tube (3) which is made of plastic material, contains said fiber (1). The method consists in placing the fibers in the first tube (3) so that they have a certain overlength with respect to said tube. Then, the assembly (1, 2, 3) is surrounded by second tube (5). The second tube (5) is placed around the first tube (1) after obtaining the overlength, from a metal tape whose longitudinal edges are butted together progressive around the assembly while being fixed to each other, then the second tube (5) is shrunk against the first tube (3). A layer adhesive material (4) is preferably interposed between the two tubes (3, 5).

14 Claims, 2 Drawing Sheets

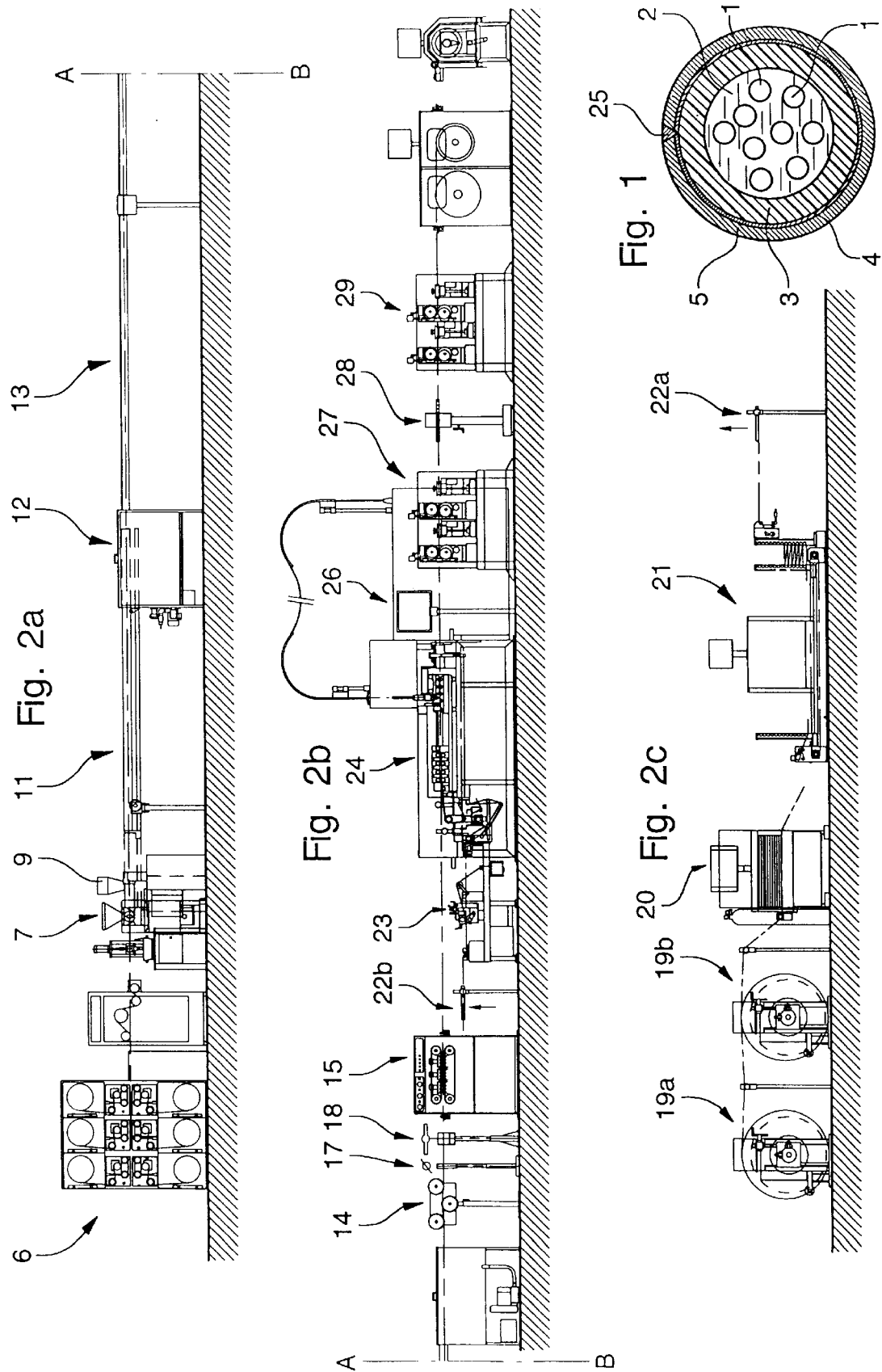

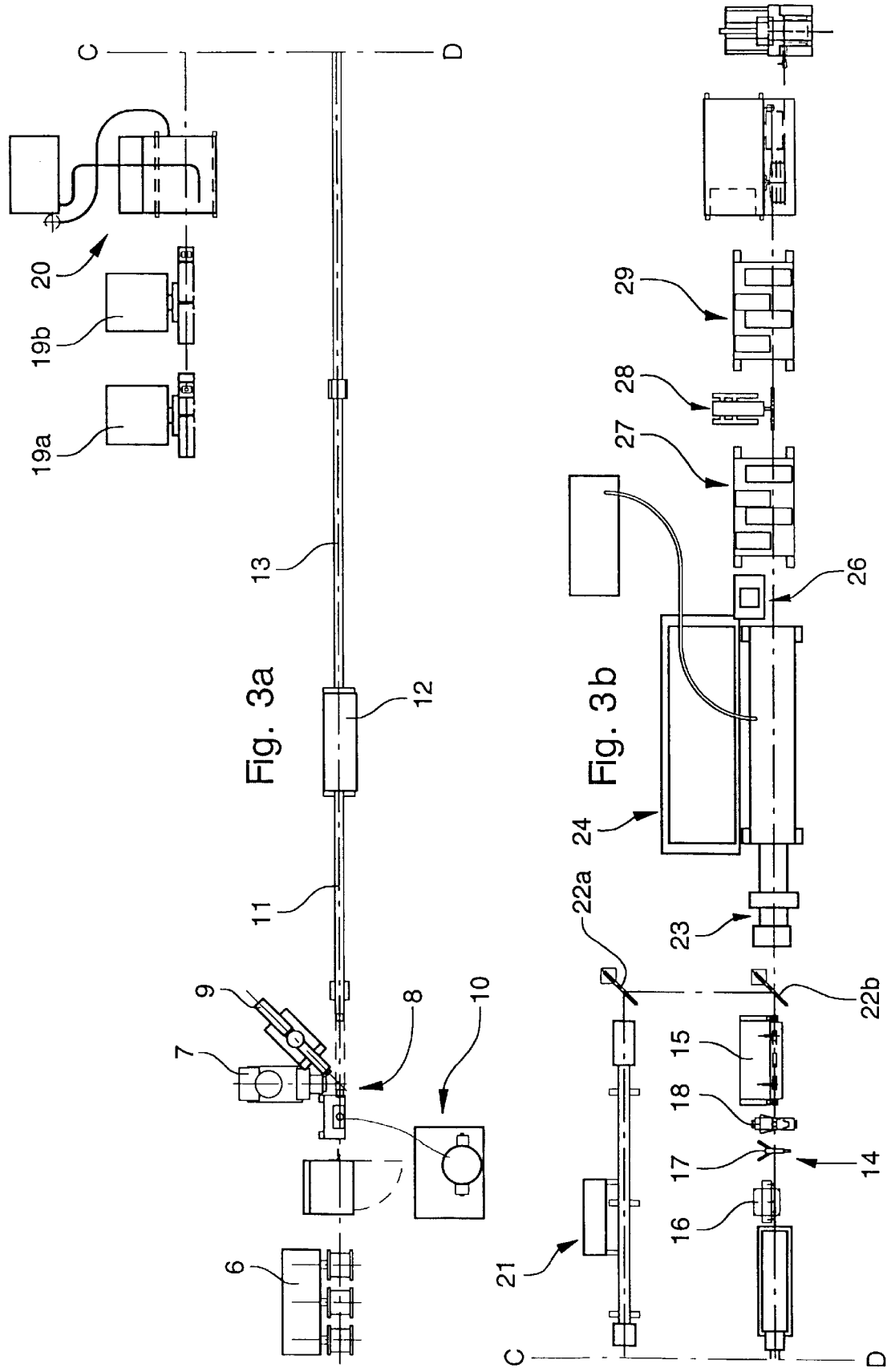

MANUFACTURING METHOD FOR AN OPTICAL CABLE AND CABLE OBTAINED BY SUCH A METHOD

The present invention relates to the manufacture of optical cables including one or more optical fibers.

The manufacture of such cables consists essentially of placing the optical fiber or fibers in a protective tube which is then filled with a viscous mass in which the fibers are embedded.

One of the major difficulties encountered in the manufacture of such cables lies in the fragility of optical fibers which, as far as possible, must not be excessively stretched longitudinally inside the tube at the risk of seeing the optical characteristics of the fibers deteriorating.

A known solution for overcoming this difficulty is to give the fiber a slightly greater length than that of the protective tube during manufacture of the cable. This difference in length between the tube and fibers may be between approximately 0.01% and 1%, according to the construction and future use of the cable.

The cables in question can be employed as overhead or underground cables, and they may advantageously be associated with high-voltage electricity transmission cables in which they can be incorporated in particular in the earth conductor.

According to a method for manufacturing such cables known from Patent Document DT-OS 2 205 621, a tube made plastic material is extruded around the optical fibers such tube being then rapidly cooled to cause longitudinal shrinkage. After cooling, the plastic tube has shrunk significantly, while the optical fibers which have a very low thermal expansion coefficient compared to that of plastic material, have not shrunk very much. They are thus incorporated in the tube, said fibers being freely disposed without being subjected to any longitudinal tension.

According to this prior document, a second tube made of plastic material is then placed around the first, the diameter of this second tube being markedly larger than that of the first tube.

Surrounding optical fibers, unreeled from a tension controlled fiber payoff reel, with a tube made of plastic material, then heating the assembly to expend it, then coiling it about a capstan so as to avoid the relative displacement in length of the fibers and the tube by mutual friction downstream of the tube cooling station is also known from Patent Document DT-OS 2 757 786.

Moreover, surrounding the optical fibers with a metal tube, in particular made of steel, possible stainless steel, is also known from several other Patent Documents, namely, for example, French Patent No 2 650 081, European Patent No 0 299 123, U.S. Pat. No 4,372,792, U.S. Pat. No. 5,263,239, U.S. Pat. No. 5,555,338 and European Patent No 0 425 160. These known methods, if they allow cables whose structure is of great solidity to be obtained, have however a major drawback in that the overlength is very difficult to obtain. If one attempts to obtain such overlength via the thermal method based on the difference in thermal expansion coefficients, one comes up against the too high temperature to which the metal must be heated, which the fibers cannot tolerate. If, on the other hand, one attempts to resolve the difficulty by extending the metal tube by traction while the fibers are placed therein, then releasing the tension on the tube, one comes up against the very high modulus of elasticity of metals, with the risk that the tube subsequently breaks from the high traction force which is then necessary. Other methods have been conceived for resolving the problem of the fibers' overlength in the case of metal protective tubes, but extreme complications of the methods to be used have always been encountered.

An optical cable including a plurality of fibers embedded in a viscous mass, this assembly being successively surrounded by an inner C-section tube either made of plastic material or of metal and a welded outer tube forming the core of the optical cable is also known from Patent Document EP-A-0 744 639. This core is coated with a strength package. The C-section tube is manufactured by extrusion and is slit longitudinally to allow the passage of optical fibers into the interior cavity of the C-section tube. This Patent Document does not however disclose or suggest means for making an overlength of the optical fibers with respect to the outer tube. It will be noted in this regard that since the inner tube is not attached in a fixed manner to the outer tube the problem of obtaining the overlength of the optical fibers with respect to a metal tube referred to above is again encountered.

An object of the invention is to provide a method for manufacturing an optical cable and an optical cable made by this method, which combine the advantages of the prior art proposals briefly described hereinbefore, without exhibiting the drawbacks thereof.

The invention concerns first of all a method for manufacturing an optical cable including at least one optical fiber placed in a protective sheath including two coaxial tubes, of which the inner tube, which is made of plastic material, contains said fiber, this method consisting in:

producing a first tube made of plastic material in which at least one optical fiber is disposed, said optical fiber having an overlength with respect to the length of said tube, and surrounding said first tube with a second tube, said method being characterised in that said second tube is made of metal, and in that it further consists in:

forming said second tube around said first tube from a metal tape whose longitudinal edges are progressively joined or butted together around said first tube while being fixed to each other, and shrinking said second tube around said first tube.

By using, according to the invention, a first tube made of plastic material in which an optical fiber or fibers are disposed, the desired overlength can be relatively simply obtained with respect to the tube, while the second metal tube does not have to undergo any special treatment to obtain such overlength. This second tube will be used to assure the structural coherence of the cable with great efficiency because there exists an intimate contact between the two tubes. Moreover, during welding of the outer tube, the fibers are protected from the heat and cannot be damaged by the welding tool.

Other features and advantages of the invention will appear during the following description, given solely by way of example and made with reference to the annexed drawings which:

FIG. 1 is a radial cross-sectional view of a cable made by the manufacturing method according to the invention;

FIGS. 2a to 2c show a schematic elevation view of an installation for implementing the manufacturing method according to the invention allowing an optical cable according to FIG. 1 to be made; and FIGS. 3a and 3b show a plane view of this installation.

The preferred embodiment of an optical cable according to the invention is shown in FIG. 1. It includes a plurality of optical fibers 1, here nine fibers, embedded in a viscous mass 2 such as a silicon gel. The fibers and the mass 2 entirely fill the interior cylindrical space of a protective sheath. According to the invention, this latter includes a first tube 3 made of plastic material which, in the present example, is surrounded by a layer of hardened adhesive material 4 which is in turn coaxially surrounded by a second outer metal tube 5. This latter is attached to the first plastic tube 3 after hardening of the adhesive material of layer 4. It will be noted however that in certain circumstances, adhesive layer 4 may be omitted.

There may be any number of optical fibers embedded in viscous mass 2; it depends only upon the technological possibilities available and the requirements for use of the optical cable in question.

The thickness of the wall of first plastic tube 3 may be selected between 0.2 and 2 mm, a preferred value being 0.5 mm. The material of which first tube 3 is made may be selected from plastic materials resisting high temperatures, the following materials being able to be envisaged: PBT, PA, PP and PC, for example.

The adhesive material of layer 4 may be any adhesive material which can be applied when warm and harden by further heating. An example of adhesive able to be used is that manufactured by the Mitsui company under the brand name ADMER.

As regards second metal tube 5, this is preferably made of a resistant to corrosion metal such as aluminium, copper, titanium, stainless steel, galvanised steel or steel made corrosion proof in some other manner, and other similar metals. The choice of metal for second tube 5 is dictated essentially by the fact that it must resist to corrosion, which is liable to appear when the cable is used in conjunction with electric conductors made of a dissimilar material, this being able to be the case in high-voltage lines for example. Thus, stainless steel is preferably used for tube 5, which is coated with an aluminium layer, if the electric conductors of the line are made of aluminium, for example.

The thickness of the wall of second tube 5 may be selected between 0.08 and 1 mm for example, a preferred value being 0.3 mm.

According to the manufacturing method of the invention (FIGS. 2a to 3b), fibers 1 are unreeled from a payoff reel 6 which holds them under a constant tension. Plastic material is extruded in an extruder 7 and passed through an extrusion die 8 in which first tube 3 is formed. Fibers 1 pass through said die 8.

A high temperature adhesive material is melted in another extruder 9 and coated onto first tube 3 which has just been formed. The adhesive material may also be co-extruded by being applied to first tube 3 during passage through die 8.

Then, an injection station 10 (FIG. 3a) injects into the inner space of first tube 3 viscous mass 2 so as to completely fill it and thus avoid any damp penetrating said first tube 3. The assembly thereby obtained leaves die 8 and passes successively into a first cooling chute 11, a traction device 1, then a second cooling chute 13 where cooling may continue. In the two cooling chutes 11 and 13, first tube 3 undergoes a longitudinal shrinkage determined by the difference in temperatures upstream and downstream of said chutes. Consequently, fiber 1 have a certain overlength with respect to tube 3.

After passing into a measuring installation 14, the assembly of first tube 3, fibers 1 and gel 2 again pass into a traction device 15. Between traction devices 12 and 15, the tension of first tube 3 is maintained at a constant value.

Measuring installation 14 includes a tension measuring unit 16 controlling traction devices 12 and 15, a diameter measuring and monitoring unit 17 arranged for measuring the diameter of first tube 3 in order to maintain this diameter at a predetermined calibrated value, and a unit 18 for measuring the speed of movement of first tube 3 at the outlet of second cooling chute 13.

Another measurement is effected upstream of die 8 to measure the speed of movement of optical fibers 1 at this place. The speed measurements of fibers 1 and tube 3 close to die 8 and in installation 14 may be achieved by means of a high precision laser measuring device whose accuracy may be of the order of 0.002%. From the two measured speeds, the measuring devices are capable of determining the ratio between the lengths of tube 3 and fibers 1 situated between them. The calculated ratio is permanently compared to a desired ratio which may be for example 0.2%. In the event of a divergence noted with respect to this desired ratio, a control signal is generated which is applied to payoff reel 6 to change the longitudinal tension applied to fibers 1 in a direction which returns the length ratio to the desired ratio.

In the preceding description, a thermal method for obtaining the overlength of fibers 1 with respect to tube 3 was described by way of example. It will however be noted that this overlength may also be obtained by a mechanical method consisting in subjecting tube 3 to mechanical traction while fibers 1 are introduced therein, the mechanical traction being released after introduction thereof.

A metal tape intended to form second tube 5 of the optical cable is unreeled alternately from two payoff reels 19a and 19b (see FIGS. 2c and 3a). These reels supply a transverse welding station 20 allowing the back end of a metal tape already passing in the installation and coming from one of the reels, to be joined to the front end of a second metal tape which will pass into the installation and which is unreeled from the second reel. Transverse welding station 20 is followed by an accumulator 21 intended to store dynamically a certain length of tape, in order for the transverse welding to be able to be performed while the two tape ends to be joined are stationary.

Reels 19a and 19b, transverse welding station 20 and accumulator 21 are placed laterally with respect to the main path of the assembly formed by fibers 1, gel 2 and first plastic tube 3. The tape leaving accumulator 21 is thus lead onto two transmission belts 22a and 22b to be introduced into this main path (FIG. 3b). Of course, we are only concerned here with an implementation example of the method of the invention, other arrangements of the various components of the installation also being able to be envisaged without departing from the scope of the invention.

The first operation which the tape undergoes is width setting in a continuous cutting station 23. Then the tape is progressively deformed in forming station 24 in which it is first deformed to form a second tube 5 and wrapped around first tube 3. Then, this second tube is welded closed along its longitudinal edges as is indicated by reference 25 in FIG. 1 in a welding station 26 placed after forming station 24. Welding station 26 may of the laser type for example.

Second tube 5 is then shrunk or reduced in diameter in a calibrating or sizing station 27 which may be formed by a sizing roll and/or die. The effect of calibration is that second tube 5 is tightly applied against the external wall of first tube 3, more precisely in intimate contact with adhesive layer 4 which externally coats first tube 3.

Next, the assembly passes into a high frequency heating device allowing second tube 5 to be heated to such an extent that adhesive layer 4 melts and adheres to the inner surface of second tube 5.

Advantageously, the assembly may also undergo another shrinking operation in a calibrating or sizing station 29 to undergo a further reduction in diameter in order to bring the cable to its nominal diameter.

The finished cable is then fed to a cutting device 30, then into a winding machine 31.

The principal advantages of the method which has just been described essentially lies in very good control of the overlength, an advantage to which is added very good cable durability due to the presence of the second metal tube. Moreover, during the welding operation of second tube 5, the fibers do not risk any deterioration because they are separated from the second tube by the first tube. This is the case, even if the welding leads to formation of a non flush weld seam inside the second tube. The second tube may further be intrinsically protected from corrosion (copper, aluminium etc.) or be protected by a coating layer which may be such that the welding can be made directly without prior special treatment. This is particularly advantageous, when the cable according to the invention is integrated in a more complex cable including several other metal elements, for example electric conductors, such a cable being often used in high-voltage lines.

Finally, all the pieces of equipment used in the method of the invention are conventional in themselves, which facilitates implementation thereof at a reasonable price.

What is claimed is:

1. A method for manufacturing an optical cable including at least one optical fiber placed in a protective sheath including two coaxial tubes, the inner tube thereof, made of plastic material, contains said fiber, this method consisting in:

producing a first tube made of plastic material in which at least one optical fiber is placed, said optical fiber having an overlength with respect to the length of said tube, and surrounding said first tube with a second tube, wherein said second tube is made of metal, and that it further consists in:

forming said second tube around said first tube from a metal tape whose longitudinal edges are progressively joined around said first tube while being fixed to each other, and shrinking said second tube around said first tube.

2. A method according to claim 1, wherein it also consists in applying a layer of adhesive material onto the outer surface of said first tube, said contracting operation causing adhesion between said first and second tubes.

3. A method according to claim 2, wherein it also consists in heating said second tube during the contracting operation in order to melt said adhesive material.

4. A method according to claim 3, wherein it further consists in contracting said second tube again consecutive to said heating operation, until its nominal diameter is obtained.

5. A method according to claim 1, wherein said second tube is made of a metal selected from aluminium, copper, titanium and steel preferably stainless or galvanised steel.

6. A method according to claim 5, wherein it consists in coating, if required, said second tube with a protective layer to prevent corrosion, preferably with aluminium.

7. A method according to claim 1, wherein it consists in:

extruding around said fiber said first plastic tube while said fiber undergoes longitudinal traction, and subjecting the assembly of said fiber and said first tube to a heat treatment to obtain said overlength.

8. A method according to claim 7, wherein it further consists in:

measuring the speed of movement of said fiber at a first point situated upstream of the point of extrusion of said first tube to obtain a first speed value, measuring the speed of movement of said first tube at a second point situated downstream of the execution of said heat treatment to obtain a second speed value, calculating from said speeds of movement, the lengths of said fiber and said first tube between said first and second points, establishing the ratio between said calculated lengths to obtain a ratio of measured lengths;

generating a desired length ratio value;

comparing said desired ratio with said measured ratio; and correcting the longitudinal tension in said fiber, when said measured ratio diverges from said desired ratio, in a direction cancelling said divergence.

9. An optical cable obtained from the method as defined in claim 1, including at least one optical fiber, surrounded by a first tube made of plastic material and a second tube coaxial with the first, wherein said second tube is made of metal and disposed in intimate contact with the first tube around the latter.

10. An optical cable according to claim 9, wherein a layer of adhesive material is interposed between said first and second tubes.

11. A method according to any of claim 1, wherein it consists in:

subjecting said first tube to mechanical traction while said fiber is introduced therein, the mechanical traction being released after such introduction.

12. A method according to any of claim 1, wherein it also consists in introducing a protective viscous mass into the interior of said first tube.

13. A method according to claim 1, wherein it further consists in applying a longitudinal tension to said first tube during and/or after said heat treatment in an opposite direction to that of the tension applied to said fiber.

14. A method according to claim 1, wherein the longitudinal edges of said second tube are fixed to each other by welding.

* * * * *